United States Patent [19]

Peterson

[11] E Re. 31,273

[45] Reissued Jun. 14, 1983

[54] CURING RIM

[75] Inventor: Harold S. Peterson, Fargo, N. Dak.

[73] Assignee: Branick Mfg. Co., Fargo, N. Dak.

[21] Appl. No.: 84,528

[22] Filed: Oct. 12, 1979

Related U.S. Patent Documents

Reissue of:

[64] Patent No.: 4,051,881
Issued: Oct. 4, 1977
Appl. No.: 666,607
Filed: Mar. 15, 1976

[51] Int. Cl.[3] ..... B60C 25/06

[52] U.S. Cl. ..... 157/1.1; 425/43; 425/51; 425/58

[58] Field of Search ..... 144/288 A, 288 R; 425/17, 49, 52, 53, 54, 58, 19, 58, 43, 36, 51; 156/156

[56] References Cited

U.S. PATENT DOCUMENTS

| | | | |
|---|---|---|---|
| 2,479,493 | 8/1949 | Horton-Wellings | 425/17 |
| 2,493,289 | 1/1950 | Hawkinson | 144/288 A |
| 2,513,482 | 4/1950 | Heintz | 425/58 |
| 2,869,180 | 1/1959 | Fassero et al. | 425/58 |
| 2,871,518 | 2/1959 | Branick | 425/58 |
| 3,837,770 | 9/1974 | Gazuit | 425/52 |

FOREIGN PATENT DOCUMENTS

| | | |
|---|---|---|
| 808481 | 2/1959 | United Kingdom . |
| 827849 | 2/1960 | United Kingdom . |
| 1061622 | 3/1967 | United Kingdom . |

*Primary Examiner*—W. D. Bray
*Attorney, Agent, or Firm*—Robert L. Lindgren; Lloyd L. Zickert; Robert W. Slater

[57] ABSTRACT

A method and apparatus for use in curing vehicle tires including a tire support rim possessing a first inlet to introduce an initial pressure into an inner tube to seat a tire on the rim. The curing rim further includes a second inlet for introducing a second pressure between the inner tube and the casing of the vehicle tire to deflate the inner tube and maintain the vehicle tire in proper position during a curing operation.

3 Claims, 3 Drawing Figures

CURING RIM

Matter enclosed in heavy brackets [ ] appears in the original patent but forms no part of this reissue specification; matter printed in italics indicates the additions made by reissue.

BACKGROUND OF THE INVENTION

This invention relates in general to vehicle tires and in particular, to a method and apparatus to be used in conjunction with curing of vehicle tires.

More specifically, the invention relates to a method and apparatus in which a curing rim having an improved static seal is utilized to support a vehicle tire during a curing operation. The improved curing rim of the invention includes means to introduce an initial pressure to an inner tube to expand a tire into seating relationship on the rim whereby the rim includes means to apply a greater pressure to the exterior of the inner tube to deflate the inner tube and apply a pressure to the tire to maintain it in position during a curing operation. The rim of the invention further includes adjustable means accommodating variable width spacers to permit the rim of the invention to be utilized with tires having a variety of widths.

It is a common process in the prior art to cure vehicle tires which method encompasses the buffing and retreading of used tires in a conventional mold under elevated heat conditions. During a curing operation, the vehicle tire is generally maintained on a curing rim whereby an inner tube within the tire is pressurized to such an extent that the tire is maintained in a pressurized condition to permit proper retreading, buffing and the like. However, the use of an inner tube to maintain proper bias of a vehicle tire during curing presents several disadvantages, particularly in conjunction with the use of very large vehicle tires such as found in land moving equipment and the like.

It has been found that often inner tubes pressurized to support a tire often burst during curing. When such failure occurs, the curing operation of a tire is seriously interferred with and improper curing most likely occurs. Moreover, the inner tube utilized to support large vehicle tires are relatively costly and it becomes very expensive to constantly have to replace these items. Thus, the failure of an inner tube within a tire during a curing operation produces serious detrimental results. For these reasons, it is desirable to provide an improved method and apparatus for supporting a vehicle tire during curing in which the aforementioned problems are alleviated.

SUMMARY OF THE INVENTION

It is, therefore, an object of this invention to improve the curing of vehicle tires.

A further object of this invention is to eliminate the necessity of utilizing an inner tube to maintain a vehicle tire in position during a curing operation.

Another object of this invention is to apply high pressure between the exterior of an inner tube and the tire casing to maintain the tire in the proper position during curing.

It is still another object of this invention to provide an curing rim having an improved static seal to achieve a more efficient and effective curing operation.

These and other objects are attained in accordance with the present invention wherein there is provided a support rim for supporting a vehicle tire during curing and having an improved static seal to permit an inner tube to be initially inflated to a predetermined pressure for seating the vehicle tire on the rim. The rim further includes means for thereafter applying a higher level of pressure between the tire casing and the inner tube for exhausting the pressure in the tube and biasing the tire in position with proper stiffness during a curing operation.

The improved support rim of the invention overcomes the aforementioned problems of the prior art by extending the lifetime of use of an inner tube and by eliminating the necessity of using the inner tube to maintain pressure against the vehicle tire during curing. Thus, the curing rim of the invention permits the vehicle tire to be more effectively maintained in position without the disadvantages of the prior art of having inner tubes burst and disrupt the entire curing process of a tire. The rim of the invention further is capable of handling a wide range of various widths of tires by a simplified and effective technique.

BRIEF DESCRIPTION OF THE DRAWINGS

Further objects of this invention, together with additional features contributing thereto and advantages accuring therefrom, will be apparent from the following description of embodiments of the invention when read in conjunction with the accompanying drawings.

DESCRIPTION OF A PREFERRED EMBODIMENT

Figure 1:
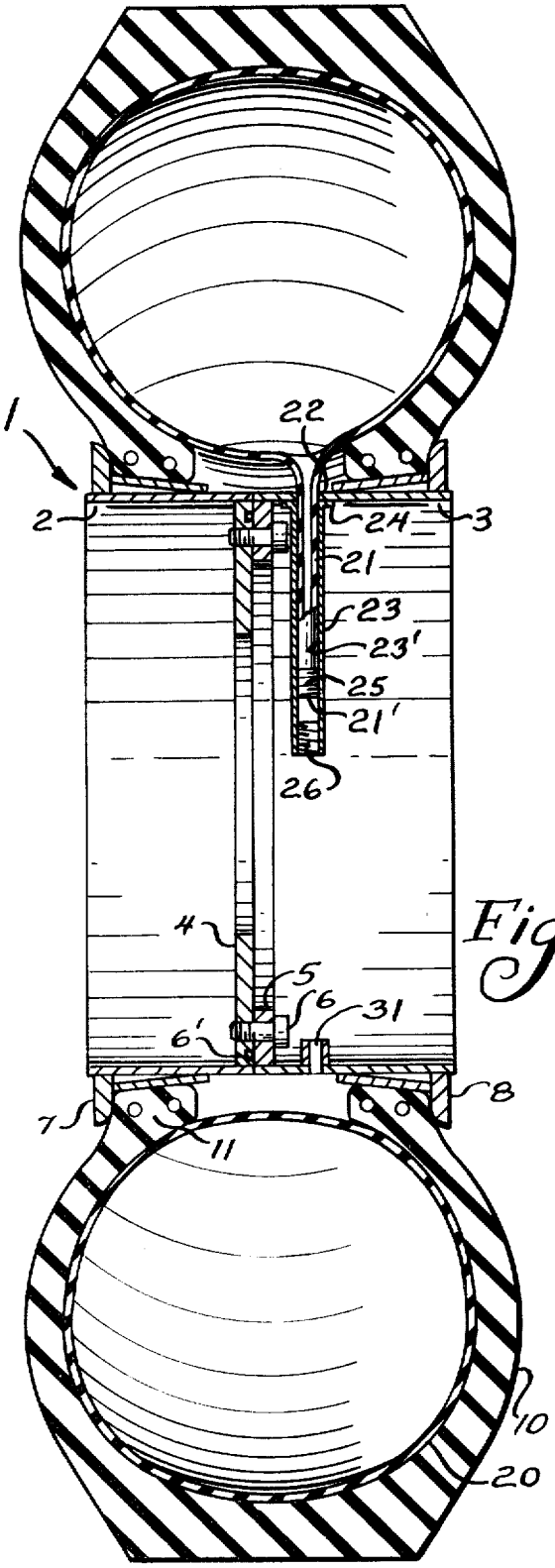
FIG. 1 is a cross sectional view of the curing rim of the invention having a tire to be cured mounted thereon and being supported for seating by an inflated inner tube.

Referring now in particular to FIG. 1 there is illustrated the improved rim of the invention supporting a vehicle tire, particularly as used in conjunction with the conventional curing operation. The body of curing rim 1 is formed from a pair of substantially identical cylindrical sleeves 2 and 3 of any suitable strong material such as metal. Sleeve 2 includes a ring 4 permanently affixed to its interior surface and sleeve 3 includes a ring 5 affixed to its interior surface whereby in an end to end relation of sleeves 2 and 3, a respective face of rings 5 and 6 substantially confront each other. Sleeves 2 and 3 are affixed in an end to end relation by means of bolts 6 which pass through suitable holes in rings 4 and 5.

Bolts 6 can be of a suitable member and generally are positioned circumferentially around rings 4 and 5. In order to maintain a static seal at the point of end to end connection of rings 2 and 3, a conventional O-ring 6′ is positioned within ring 4 around its circular extent and permits pressurization of a tire mounted on rim 1. Rim flanges 7 and 8 are integrally attached to sleeves 2 and 3 and are disposed on opposite sides of the curing rim and extend circumferentially around the rim for bearing contact with the bead of a vehicle tire.

Still referring to FIG. 1, a tire 10 being mounted on curing rim 1 is shown and includes a conventional bead which when pressure is applied to the interior of the tire will seat against flanges 7 and 8 in a sealing relationship. An inner tube 20 of any suitable inflatable material such as rubber is adapted to be positioned within tire 10. In FIG. 1 inner tube 20 is in an inflated condition to force tire bead 11 against rim flanges 7 and 8. To cause such seating of the tire bead, air is introduced through tube stem 21 extending through an inlet 22 formed in sleeve 3. It has been found that seating of a tire can be achieved in the present invention by a pressure of approximately 30 pounds per square inch. However, the pressure necessary to seat the bead in sealed relationship on the rim can be of variable magnitudes dependant on such factors as tire size, material and the like.

Figure 2:
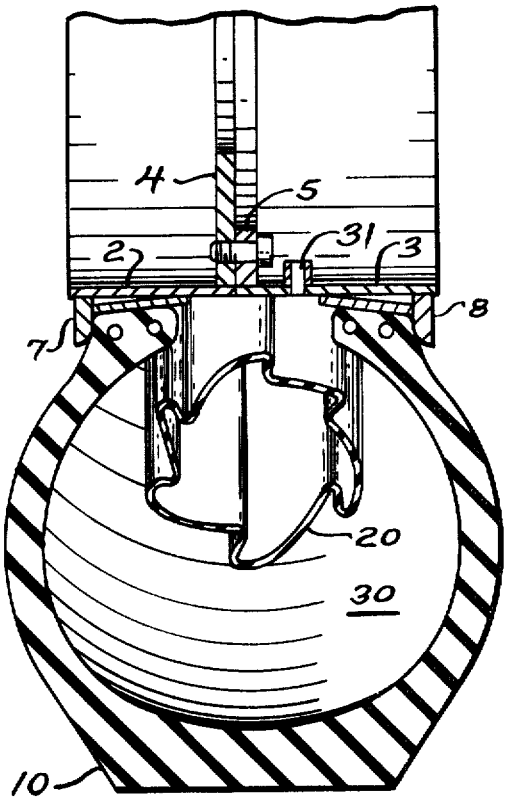
FIG. 2 is a partial cross sectional view of the curing rim of FIG. 1 illustrating the condition of the tire after the application of pressure between the tire interior and the tube.

Referring to FIG. 2 there is illustrated the condition of inner tube 20 within the tire during the actual curing operation. The pneumatic pressure initially introduced into the inner tube 20 to seat bead 11 is discharged from the tube through stem 21 by the application of a higher pressure between the casing of the tire 10 and the exterior of the inner tube 20 in area 30. Such a pneumatic pressure can be applied from any conventional pressure source through an inlet 31 within one of the sleeves 3 and 4 whereby a pressure up to 225 p.s.i. can be forced between the outside of the tube and the inside of the tire. Such a pressure will cause the collapse of the inner tube since the original pressure for seating bead 11 escapes through stem 21. It should be noted that the tube stem 21 may be secured to any suitable means such as stem clamp 23 attached to inlet 22 and thus remains in position therethrough despite collapsing of the tube. Stem clamp 23 comprises a cylindrical tube having a passage 23' and a washer 24 attached at one end. Tube stem 21 includes a threaded end 21' which is attached to internal threads 25. The end clamp 23 includes threads 26 which attach to a pneumatic pressure source. As shown in FIG. 1 a face of washer 24 contacts sleeve 3 adjacent hole 22 in sealed relationship. The pressure exiting through tube stem 21 during application of the second pressure can be directed to the atmosphere or a collection manifold (not shown) and the like as suitable.

Although the invention is not intended to be so limited, a plug (not shown) can be attached to stem 21 after the original pressure is introduced into tube 20 to maintain the pressure within the tube to insure seating of bead 11 if necessary under certain circumstances. Such a plug can be removed prior to or simultaneous with the application of curing pressure through inlet 31 to permit proper exhausting from tube 20. Alternatively, pressure may also sequentially applied through stem 21 and inlet 31 by use of a suitable valving mechanism (not shown) permitting both pressurization and exhausting in accordance with the foregoing description of the invention.

Figure 3:
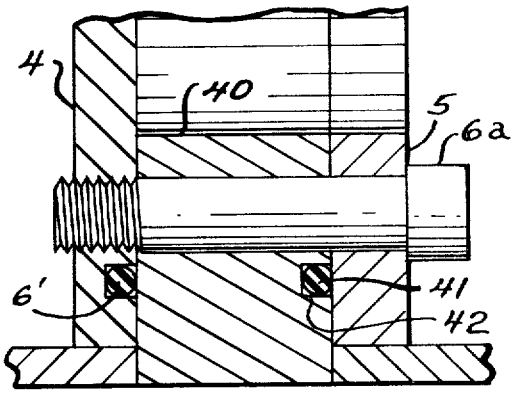
FIG. 3 is an enlarged partial sectional view of a spacer for varying the width of the curing rim of the invention.

In view of the fact that the stem 21 is retained in inlet 22 after discharge, tube 20 most likely hangs in approximately the position shown in FIG. 3. The application of pressure into area 30 of the tire 10 is sufficient to maintain the tire in proper position during a curing operation and alleviates completely the problem of a stress being applied to the inner tube. It should be apparent that rim 1 maintains the tire in a sealed pressurized relationship during the curing process.

Referring to FIG. 3 there is illustrated a spacer element which permits the curing rim of the invention to accommodate tires of varying widths having a common diameter. Such accommodation for varying widths of the tires is accomplished by the use of spacer 40 as illustrated in FIG. 3. Spacer 40 can be of any predetermined width dependent on the size of a tire to be cured. Spacer 40 is constructed of a suitably hard material to adequately seal the pressure within the tire even during high pressurization and is situated between ends of sleeves 2 and 3 and between the corresponding faces of rings 5 and 6. One side of spacer 40 is sealed by means of O-ring 6' provided in ring 4 and at the other side is sealed by a circular O-ring 41 positioned within a groove 42 formed in the end of spacer 40. Sleeves 4 and 5 and spacer 40 are retained together by means of a series of circumferentially arranged bolts 6a, passing through rings 4 and 5 and spacer 40. It should be apparent to one skilled in the art that the length of bolts 6a used in conjunction with the spacer 40 depends on the selected width of spacer 40.

In operation of the curing rim of the invention as described in the foregoing description, a vehicle tire to be cured having an inner tube therein is positioned upon the curing rim and a pressure sufficient to inflate the inner tube 20 is introduced through inlet 21 whereby the bead 11 of tire 10 is seated against flanges 7 and 8. After seating of the tire against the flanges, pressure from a suitable pneumatic source is introduced through inlet 31 between the exterior of the inner tube 20 and the interior of the tire casing so that the pressure within the inner tube is discharged through inlet 21. A pressure of up to 225 p.s.i. or other appropriate magnitude effectively maintains the tire properly in position during the curing operation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that this invention not be limited to the particular embodiment disclosed as the best mode contemplated for carrying out this invention, but that the invention will include all embodiments falling within the scope of the appended claims.

What is claimed is:

[1. A rim for supporting a vehicle tire during a curing operation comprising:

a pair of sleeves adapted to be secured in an end to end relationship;

said sleeves including attachment means to secure said sleeves for support of a vehicle tire during a curing operation;

sealing means operatively coupled to said sleeves to retain a vehicle tire in sealed relation on the periphery of said sleeves;

one of said sleeves including an inlet opening therein for receiving said stem of an inner tube within a vehicle tire; and said one of said sleeves further including a second inlet therein defining means applying a pressurized fluid between the interior of a vehicle tire and the exterior of an inner tube.]

[2. The rim of claim 1 further comprising spacer means adapted to be connected to said attachment means to vary the width of sleeves to accommodate vehicle tires of selected width.]

[3. The rim of claim 1 wherein said attachment means includes a pair of rings respectively affixed to the inner periphery of said sleeves.]

[4. The rim of claim 3 wherein said attachment means further includes bolt means adapted to pass through said rings to secure said sleeves in an end to end relationship.]

[5. The rim of claim 4 wherein said sleeves respectively include a flange positioned at opposite end thereof on the periphery of said sleeves.]

[6. A rim for supporting a vehicle tire during a curing operation comprising:

body means for supporting a vehicle tire in a sealed relation thereon;

said body means having a first inlet means for introducing pressure into an inner tube positioned within a vehicle tire; and said body means further including a second inlet opening for introducing pressure into said tire between said inner tube and the interior of the vehicle tire.]

7. A method of supporting a vehicle tire during a curing operation comprising the steps of:

mounting a vehicle tire having an inner tube on the periphery of a rim;

introducing a predetermined pressure into said inner tube for inflation thereof for seating the bead of the vehicle tire in sealed relationship on the rim; and introducing pressure greater than said predetermined pressure into said vehicle tire between the interior of the tire and the outer periphery of the inner tube to exhaust said predetermined pressure from the inner tube and bias said tire in position during a curing operation.

8. The method of claim 7 wherein said predetermined pressure is of a magnitude of up to 30 pounds per square inch.

9. The method of claim 8 wherein said pressure greater than said predetermined pressure is of a magnitude of up to 225 pounds per square inch.

* * * * *